Figure 4:
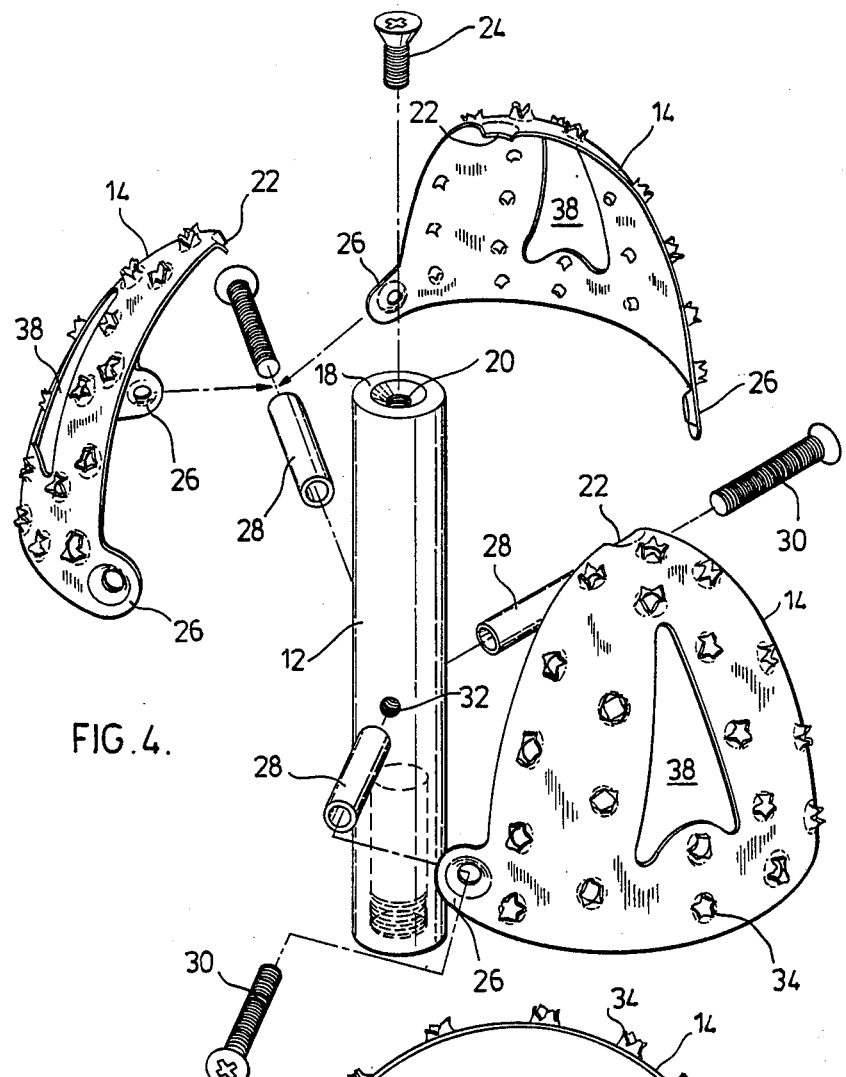

United States Patent [19]

Thompson

[11] 4,441,410

[45] Apr. 10, 1984

[54] COCONUT GRATER

[76] Inventor: Noel A. Thompson, 8 E. Charlemont Dr., Kingston 6, Jamaica

[21] Appl. No.: 383,443

[22] Filed: Jun. 1, 1982

[51] Int. Cl.$^3$ ............................ A23N 5/03; A23N 5/08
[52] U.S. Cl. ............................................ 99/538; 99/505; 99/537; 99/568; 241/93; 241/273.3
[58] Field of Search .................. 99/495, 496, 501–508, 99/537, 538, 539–541, 567, 568, 574–576, 584, 588, 590, 591, 593, 623, 628, 646 R; 100/104, 110, 116, 213; 241/93, 273.3; 30/352, 276, 287

[56] References Cited

U.S. PATENT DOCUMENTS

| | | | |
|---|---|---|---|
| 1,290,262 | 1/1919 | Lyttle | 99/508 |
| 2,365,358 | 12/1944 | Rector | 99/538 |
| 3,016,075 | 1/1962 | Mantelet | 99/504 |
| 4,350,088 | 9/1982 | Rubio, Jr. | 99/538 |

FOREIGN PATENT DOCUMENTS 123674 3/1919 United Kingdom .................. 99/501

*Primary Examiner*—Timothy F. Simone
*Attorney, Agent, or Firm*—Robert F. Delbridge; Arne I. Fors

[57] ABSTRACT

A coconut grater for grating and removing the coconut flesh from the interior of a coconut shell has a rotatable shaft and a plurality of curved grating members. Each grating member has a front portion secured to a leading end of the shaft and then curving outwardly and rearwardly to extend in spaced relation to the shaft. A plurality of angularly spaced struts extend radially from the shaft at a location rearwardly spaced from the leading end thereof. Each grating member has a rear portion secured to at least one of the struts, and also has grating edges formed by small apertures with outwardly projecting sharp edges.

9 Claims, 5 Drawing Figures

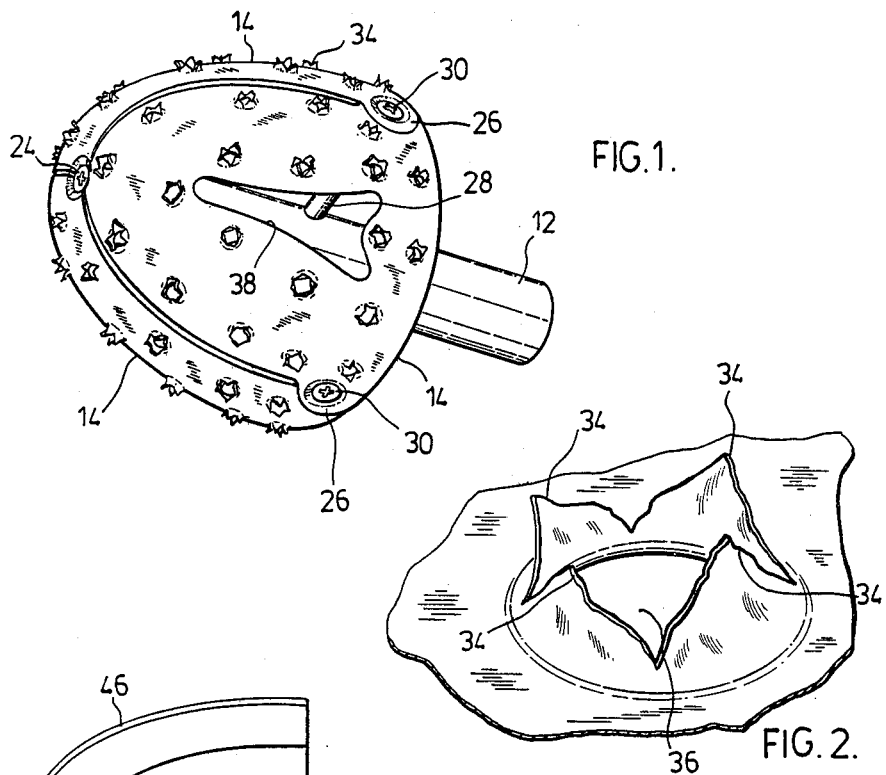
FIG. 1.
FIG. 2.
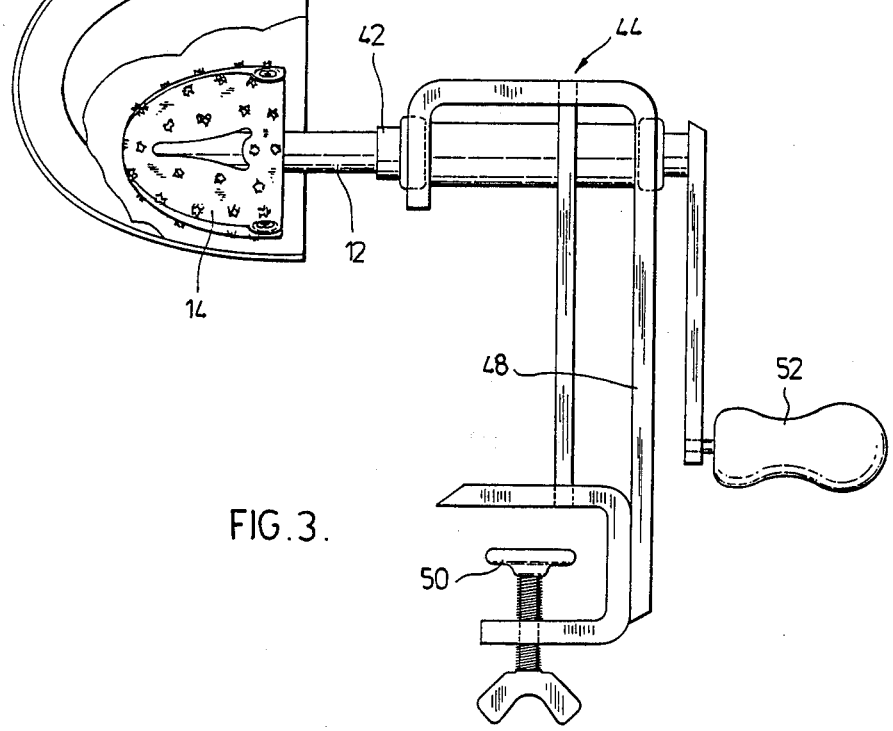
FIG. 3.

COCONUT GRATER

This invention is a rotary grater for grating and removing the coconut "flesh" from the interior of coconut shells. It is easily operated when attached to a suitable rotating device.

The coconut, with its flesh stuck to the inside of a hard shell, has traditionally posed unique problems for those who wish to grate it. This rotary grater is meant to provide an easy, convenient and more efficient way to accomplish the task.

Its design emphasizes cutting efficiency and ease of operation. Sharp, well-formed and strategically located cutting edges ensure efficient cutting, while extensive surface areas surrounding these edges contribute to operating smoothness.

The basic ability of this coconut grater resides in its unique configuration. It marks a departure from current conventional graters and from rotary ideas previously proposed. The net result is a grater which, while retaining the principle of a simple design, brings a new sense of ease and efficiency to the task of grating coconuts.

According to the invention, a coconut grater for grating and removing the coconut flesh from the interior of coconut shells comprises a rotatable shaft, a plurality of curved grating members each having a front portion secured to a leading end of the shaft and then curving outwardly and rearwardly to extend in spaced relation to the shaft, and a plurality of angularly spaced struts extending radially from the shaft at a location rearwardly spaced from the leading end thereof, each grating member having a rear portion secured to at least one of the struts, and each grating member also having grating means formed by small apertures therein with outwardly projecting sharp edges.

A grater in accordance with the invention is effective to efficiently grate and remove the coconut flesh from the interior of coconut shells, but is, at the same time, simple, inexpensive and durable.

The grating members may co-operate to form a substantially continuous mushroom-shaped grating surface, and the front portions of the grating members may be secured to the shaft by a retaining device engaged in the leading end thereof. The leading end of the shaft may be hollow, with the front portions of the grating members being bent to extend into the hollow leading end for retention by the retaining device.

The rear portion of each grating member may be secured to two struts at laterally spaced positions, and the rear portions of adjacent grating members may overlap at each strut and be secured thereto. Each rear portion of a grating member may be secured to a respective strut by a retaining device passing through the rear portion into the strut. Each strut may be hollow with the retaining device passing through the strut into the shaft.

The rear portion of the shaft may possess appropriate threads for attachment to a suitable rotating device.

At least one of the grating members may have a relatively large longitudinally extending aperture to enable some grated coconut to pass into the interior of the grater and out the open back end.

Figure 5:
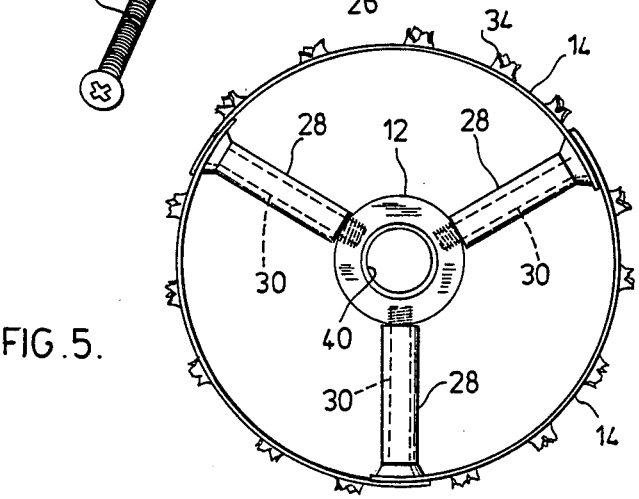

One embodiment of the present invention will now be described, by way of example, with reference to the accompanying drawings, of which:

FIG. 1 is a perspective view of a coconut grater in accordance with the invention, FIG. 2 is an enlarged view of a set of grating edges, FIG. 3 shows the grater attached to a rotating device and engaged in the interior of one half of a coconut shell, FIG. 4 is an exploded view of the grater, and FIG. 5 is a rear end view of the grater.

Referring to the drawings, a coconut grater has a central shaft 12 with three curved grating members 14 of sheet metal secured thereto to form a substantially continuous mushroom-shaped grating surface. The leading end of the shaft 12 has a recess 18 with a central threaded bore 20, and each grating member 14 has a front portion 22 bent to extend into the recess 18. A screw 24 is secured in the threaded bore 20 so that the front portions 22 of the grating members 14 are retained in position in the recess 18 by the head of the screw 24.

Each grating member 14 curves outwardly and rearwardly from its front portion to extend in spaced relation to the shaft 12. The rear portion of each grating member 14 has apertured lugs 26 at each side, with each lug 26 overlapping the lug 26 of an adjacent grating member 14. The grater also has three angularly spaced tubular struts 28, with each strut 28 extending between a pair of overlapping lugs 26 and the shaft 12. A screw 30 passes through each pair of overlapping lugs 26 and the associated struts 28 into a tapped hole 32 in the shaft 12.

Each grating member 14 has a series of sets of outwardly projecting sharp grating edges 34, with one set being shown in detail in FIG. 2. As shown, there are four grating edges 34 in each set, the edges 34 having been punched out of the sheet metal grating members so that the four grating edges 34 surround a small aperture 36. Each grating member 14 also has a relatively large longitudinal extending aperture 38 to enable grated coconut to pass into the interior of the grater.

The rear end of the shaft 12 has a threaded bore 40 to enable the grater to be secured to a shaft 42 of a rotating device 44, the forward end of the shaft 42 having a threaded portion (not shown) which is received in the bore 40 of the shaft 12. The rotating device may be of any suitable construction, and may be manually or power operated. As shown, the rotating device 44 may have a frame 48 with a clamp 50 enabling the device to be secured to the edge of a table, or other suitable location, and a handle 52 for rotating the shaft 42.

In use, the grater is rotated by rotating the shaft 42 of the rotating device 44 so that the grating members 14 engage the interior of a half-shell 46 of the coconut, thereby causing the grating edges 34 to grate the coconut flesh on the interior of the shell. Some grated particles then pass through the small apertures 36 and the large apertures 38 into the interior of the grater and out the open back end, while most of the grated particles fall directly from the interior of the coconut shell to a suitable receptacle placed directly below.

It will thus be readily appreciated that the described grater is of simple, rugged, inexpensive construction, while at the same time being capable of efficiently grating and removing the coconut flesh from the interior of a coconut shell.

Other embodiments of the invention will be apparent to a person skilled in the art, the scope of the invention being defined in the appended claims.

What I claim as new and desire to protect by Letters Patent of the United States is:

1. A coconut grater for grating and removing the coconut flesh from the interior of a coconut shell, comprising a rotatable shaft having a leading end, a plurality of separate curved grating members each having a front portion, securing means securing each front portion to the leading end of the shaft, each grating member curving outwardly and rearwardly from the front portion to extend in spaced relation to the shaft and form an interior area having an open back end, a plurality of angularly spaced struts extending radially from the shaft at a location rearwardly spaced from the leading end thereof, each grating member having a rear portion, further securing means securing each rear portion to at least one of the struts, and each grating member also having grating means formed by small apertures therein with outwardly projecting sharp edges.

2. A grater according to claim 1 wherein the grating members co-operate to form a substantially continuous mushroom-shaped grating surface.

3. A grater according to claim 1 wherein the front portions of the grating members are secured to the shaft by a retaining device engaged in the leading end thereof.

4. A grater according to claim 3 wherein the leading end of the shaft is hollow and the front portions of the grating members are bent to extend into the hollow leading end for retention by the retaining device.

5. A grater according to claim 1 wherein the rear portion of each grating member is secured to two struts at laterally spaced positions.

6. A grater according to claim 5 wherein the rear portions of two grating members overlap at each strut and are secured thereto.

7. A grater according to claim 1 wherein each rear portion of a grating member is secured to a respective strut by a retaining device passing through the rear portion into the strut.

8. A grater according to claim 7 wherein each strut is hollow and the retaining device passes through the strut into the shaft.

9. A grater according to claim 1 wherein at least one of the grating members has a relatively large longitudinally extending aperture to enable grated coconut to pass into the interior of the grater and out the open back end.

* * * * *